US012559155B2

(12) United States Patent
Hu

(10) Patent No.: US 12,559,155 B2
(45) Date of Patent: Feb. 24, 2026

(54) CHILD STROLLER

(71) Applicant: Wonderland Switzerland AG, Steinhausen (CH)

(72) Inventor: Shoufeng Hu, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 494 days.

(21) Appl. No.: 17/964,870

(22) Filed: Oct. 12, 2022

(65) Prior Publication Data

US 2023/0122248 A1     Apr. 20, 2023

(30) Foreign Application Priority Data

Oct. 14, 2021     (CN) .......................... 202122481644.5

(51) Int. Cl.
  *B62B 7/06*          (2006.01)
  *B62B 7/14*          (2006.01)
(52) U.S. Cl.
  CPC .............. *B62B 7/062* (2013.01); *B62B 7/145* (2013.01); *B62B 2205/20* (2013.01); *B62B 2205/24* (2013.01)
(58) Field of Classification Search
  CPC .......... B62B 9/28; B62B 7/142; B62B 7/145; B62B 7/14; B62B 7/147
  See application file for complete search history.

(56) References Cited

U.S. PATENT DOCUMENTS

| | | | | |
|---|---|---|---|---|
| 5,454,584 | A * | 10/1995 | Haut .......................... | B62B 7/08 |
| | | | | 297/16.2 |
| 10,479,391 | B2 * | 11/2019 | Haut .......................... | B62B 7/10 |

| | | | | |
|---|---|---|---|---|
| 11,325,632 | B2 * | 5/2022 | Zhu .......................... | B62B 7/08 |
| 11,673,596 | B2 * | 6/2023 | Li .......................... | B62B 9/102 |
| | | | | 280/658 |
| 11,807,289 | B2 * | 11/2023 | Zhong ...................... | B62B 7/062 |
| 2019/0322304 | A1 * | 10/2019 | Zhong ...................... | B62B 7/142 |
| 2020/0172142 | A1 * | 6/2020 | Young ...................... | B62B 7/142 |
| 2021/0016818 | A1 * | 1/2021 | Zhu .......................... | B62B 7/062 |

FOREIGN PATENT DOCUMENTS

| | | |
|---|---|---|
| CN | 202294915 U | 7/2012 |
| CN | 211995813 U | 11/2020 |
| CN | 112238889 A | 1/2021 |
| WO | WO-2018051807 A1 * | 3/2018 ............... B62B 7/08 |

OTHER PUBLICATIONS

Office action mailed/issued on Jun. 16, 2023 for TW application No. 111138928, filing date: Oct. 14, 2022, pp. 1-9., Jun. 16, 2023.

* cited by examiner

*Primary Examiner* — Emma K Frick

(74) *Attorney, Agent, or Firm* — Winston Hsu

(57)          ABSTRACT

A child stroller is provided in the present disclosure. A frame of the child stroller includes a first bracket and a second bracket that are foldable. The first bracket is provided with an engaging member, the engaging member includes a first engaging portion and a second engaging portion, and the first engaging portion is configured to be detachably engaged with a child carrier. The second bracket is provided with a locking portion, and when the first bracket and the second bracket are in a folded state, the locking portion and the second engaging portion are detachably engaged with each other to lock the first bracket and the second bracket in the folded state.

15 Claims, 4 Drawing Sheets

<u>100</u>

CHILD STROLLER

BACKGROUND OF THE INVENTION

1. Field of the Invention

The present disclosure relates to a child stroller.

2. Description of the Prior Art

Child strollers are commonly used in families with infants and provide great convenience to travel. In general, the child stroller can be unfolded or folded. The child stroller can carry the infant in the unfolded state, and occupy limited space in the folded state.

In order to stably keep the folded child strollers in the folded state, some child strollers are equipped with folding hooks and locking portions for a specific purpose. The folding hook and the locking portion are mounted on two foldable brackets of the frame of the child stroller, respectively, and the folding hook is provided with a locking recess for accommodating the locking portion. When the frame of the child stroller is in the folded state, the locking portion is engaged with the locking recess of the folding hook, thereby locking relative positions of the two brackets of the frame, which can effectively prevent the folded child stroller from being accidentally unfolded during movement. For convenience during engagement and disengagement of the folding hook and the locking recess, the folding hook is pivotally mounted on one of the brackets of the frame in general, and the bracket is further provided with a pusher and a spring. The spring is used to keep the folding hook at a connection position where the folding hook can be engaged with the locking portion. When stressed, the pusher can push the folding hook to rotate against force of the springs, thus disengaging the folding hook from the locking portion.

SUMMARY OF THE INVENTION

The present disclosure aims to provide a child stroller with a simple structure and multiple functions. The child stroller can be locked in a folded state when folded, and can be used in cooperation with an additional child carrier when unfolded.

The present disclosure discloses a child stroller. A frame of the child stroller may include a first bracket and a second bracket that are foldable. The first bracket can be provided with an engaging member, the engaging member includes a first engaging portion and a second engaging portion, and the first engaging portion is configured to be detachably engaged with a child carrier. The second bracket may be provided with a locking portion. When the first bracket and the second bracket are in a folded state, the locking portion and the second engaging portion are detachably engaged with each other to lock the first bracket and the second bracket in the folded state.

Further, the locking portion may include a locking stud.

Further, a first end of the engaging member may sleeve the first bracket and may be fixed by a hinge pin, and the first engaging portion and/or the second engaging portion may be arranged near a second end of the engaging member.

Further, the first bracket may be a backrest frame, and the second bracket may be a handle frame; and the frame may further include a front wheel support, a rear wheel support and a connection frame, wherein an upper end of the rear wheel support may be provided with a pivotal portion, an upper end of the front wheel support may be pivotally connected to a first connection portion of the pivotal portion, a lower end of the connection frame may be pivotally connected to a second connection portion of the pivotal portion, an upper end of the connection frame may be pivotally connected to a first pivotal connection portion of the second bracket, the first bracket may be pivotally connected to the rear wheel support via a second pivotal connection portion, and an upper end of the first bracket may be pivotally connected to a lower end of the second bracket.

Further, the child stroller may include a seat portion mounted on the frame; and/or the child carrier may be a car seat or a carry-cot.

Further, the first engaging portion may include a first recess and the second engaging portion may include a second recess.

Further, the first recess may be arranged at a first side of the engaging member, and the second recess may be arranged at a second side of the engaging member, the first side and the second side facing away from each other.

Further, the second side of the engaging member may be provided with a protrusion portion and a guide slope connected to the protrusion portion, the second recess may be formed in the protrusion portion, and the locking portion may be configured to be engaged into the second recess via the guide slope.

Further, the child carrier may be provided with an elastically retractable engaging block configured to be engaged with the first recess.

Further, the engaging block may be provided with a mounting slope, and a depth of an upper portion of the first recess may be smaller than a depth of a lower portion of the first recess.

According to the child stroller provided in the present disclosure, by arranging the first engaging portion and the second engaging portion on the engaging member, the engaging member may be detachably engaged with the child carrier via the first engaging portion when the frame is unfolded, and may be detachably engaged with the locking portion via the second engaging portion when the frame is folded, such that the engaging member may be used as a folding hook, and the child stroller requires no additional folding hook, thus simplifying the structure of the frame, reducing cost of the frame, and improving an appearance design of the frame advantageously.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
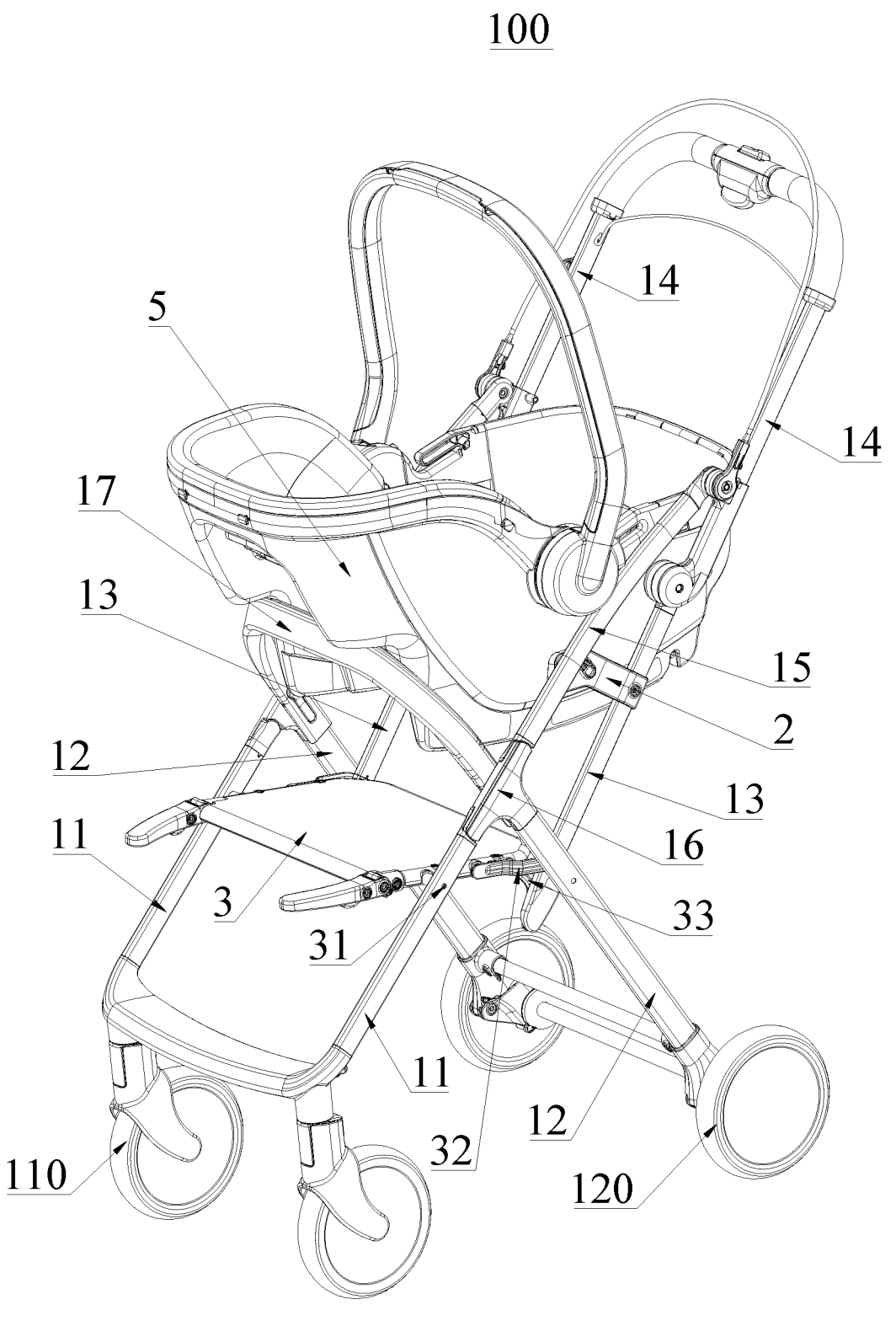
FIG. 1 is a perspective schematic view of a child stroller in an unfolded state according to an embodiment of the present disclosure.

Embodiments of the disclosure are described more fully hereinafter with reference to the accompanying drawings. The various embodiments of the disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Elements that are identified using the same or similar reference characters refer to the same or similar elements.

Figure 2:
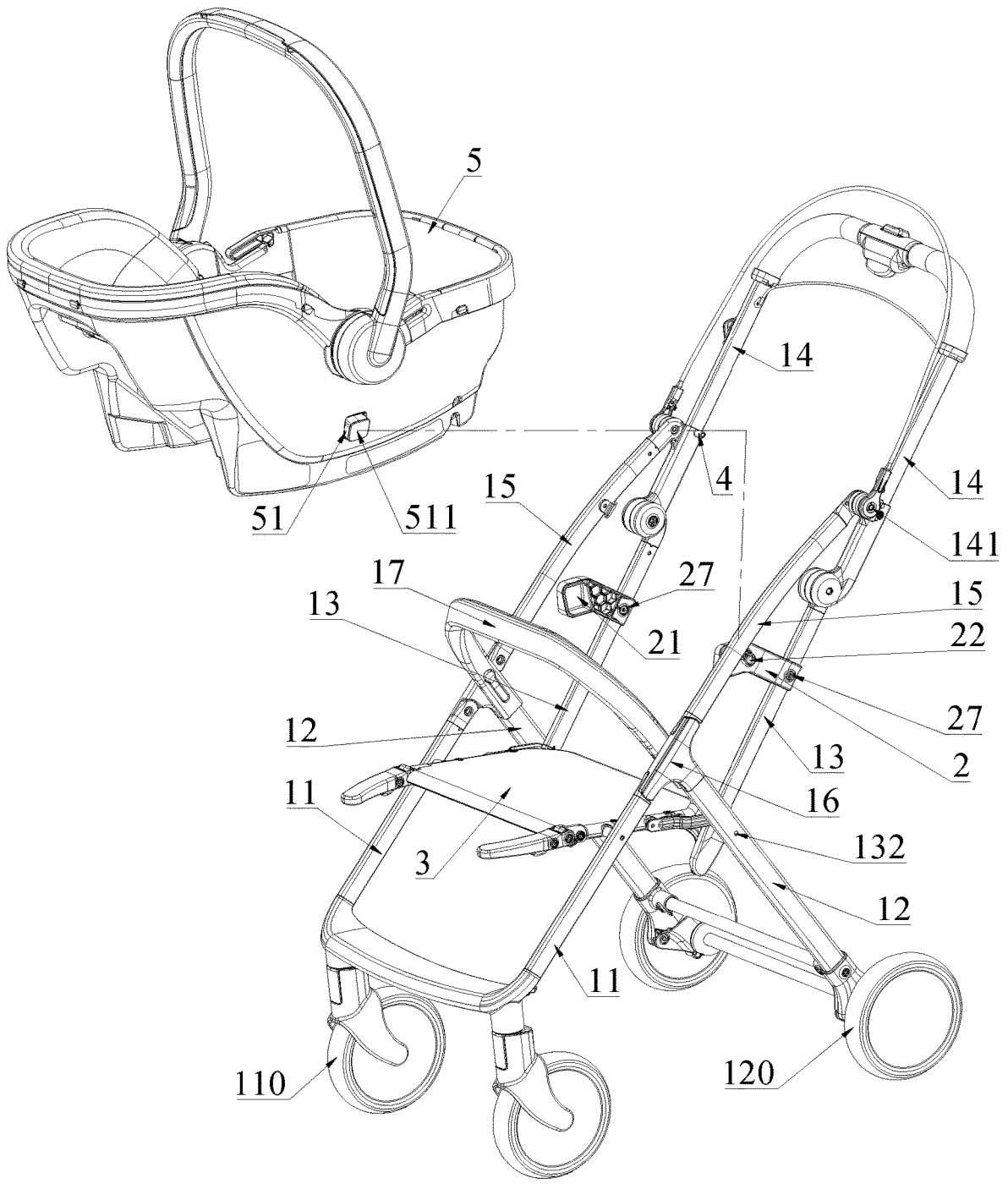
FIG. 2 is a perspective schematic view of a child stroller according to an embodiment of the present disclosure, in which a child carrier is separated from a frame.
Figure 3:
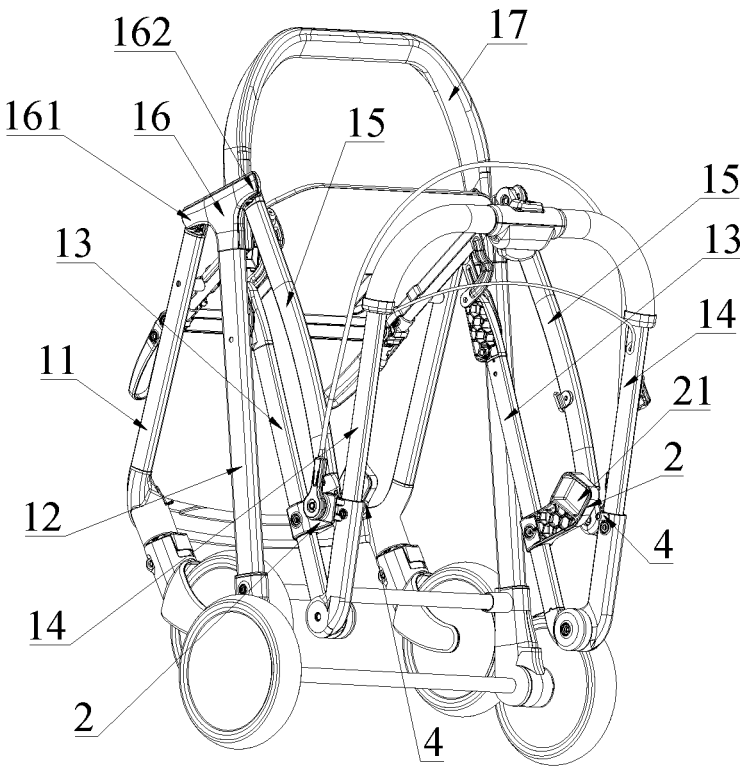
FIG. 3 is a perspective schematic view of a child stroller in transition from an unfolded state to a folded state according to an embodiment of the present disclosure.

FIGS. 1 to 4 show a structure of a child stroller 100 according to an embodiment of the present disclosure. As shown in the figures, a frame of the child stroller 100 is foldable, and includes, for example, a front wheel support 11, a rear wheel support 12, a first bracket 13, a second bracket 14, a connection frame 15 and a front armrest frame 17. The first bracket 13 is, for example, a backrest frame, and the second bracket 14 is, for example, a handle frame. A rear wheel 120 is mounted at a lower end of the rear wheel support 12, and a pivotal portion 16 is mounted at an upper end of the rear wheel support 12. In some embodiments, the pivotal portion 16 may have a shape similar to a "T" shape. Two ends of a horizontal portion of the T-shaped pivotal portion 16 form a first connection portion 161 and a second connection portion 162, respectively, and a vertical portion of the T-shaped pivotal portion 16 is configured to be connected to the upper end of the rear wheel support 12. A front wheel 110 may be mounted on a lower end of the front wheel support 11, and an upper end of the front wheel support 11 is pivotally connected to the first connection portion 161 of the pivotal portion 16 (as shown in FIG. 3). A lower end of the connection frame 15 is pivotally connected to the second connection portion 162 of the pivotal portion 16, an upper end of the connection frame 15 is pivotally connected to a first pivotal connection portion 141 of the second bracket 14, and the first pivotal connection portion 141 is located near a lower end of the second bracket 14. The first bracket 13 is pivotally connected to the rear wheel support 12 via a second pivotal connection portion 132, the second pivotal connection portion 132 is located near a lower end of the first bracket 13, and an upper end of the first bracket 13 is pivotally connected to the lower end of the second bracket 14. The front armrest frame 17 is, for example, detachably connected to the middle of the pivotal portion 16.

It should be noted that positional terms such as "upper", "lower", "front" and "rear" herein are explained with reference to the unfolded state of the frame. These positional terms are merely used to make description of the present disclosure clearer, and are not used to improperly limit the protection scope of the present disclosure.

Reference is made to FIG. 1. The frame may be provided with a seat portion 3. A front side of the seat portion 3 is pivotally connected to the front wheel support 11 via a hinge pin 31, a middle portion of the seat portion 3 is connected to the rear wheel support 12 and/or the first bracket 13 via a first connector 32, and a rear side of the seat portion 3 is connected to the lower end of the first bracket 13 via the second connector 33. It can be understood that in other embodiments, the frame of the child stroller 100 may have different structures, and are not limited to the above examples.

Figure 5:
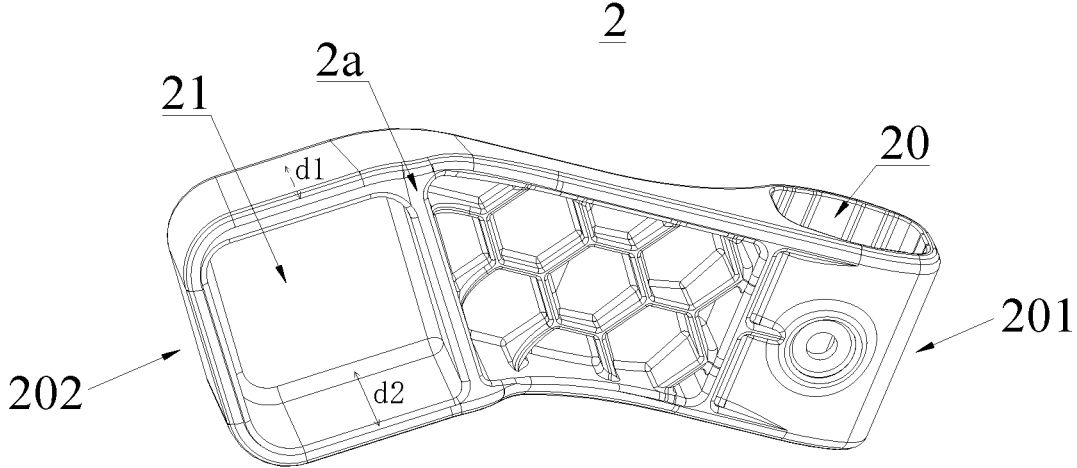
FIG. 5 is a perspective schematic view of an engaging member of a child stroller according to an embodiment of the present disclosure.
Figure 6:
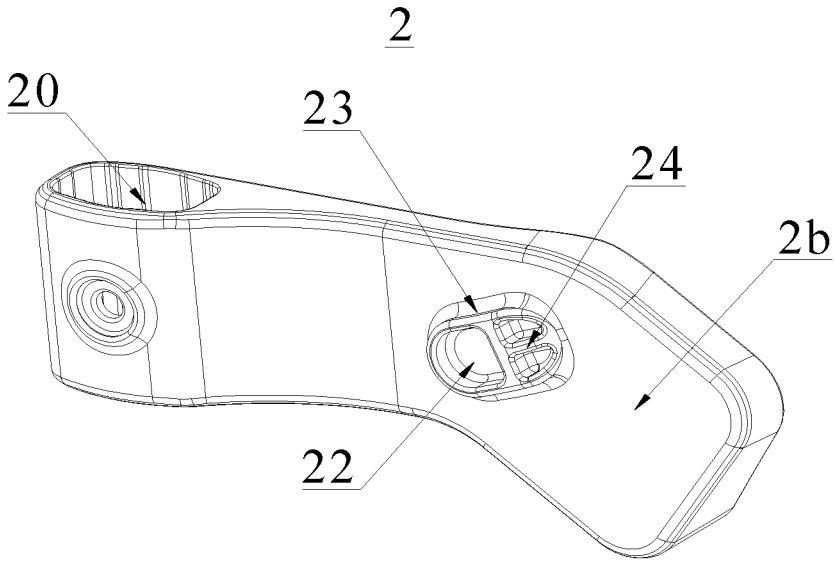
FIG. 6 is another perspective schematic view of an engaging member of a child stroller according to an embodiment of the present disclosure.

Reference is made to FIGS. 2, 5 and 6. The first bracket 13 may be provided with an engaging member 2, and the engaging member 2 may be provided with a first engaging portion 21 and a second engaging portion 22. In some embodiments, for example, the engaging member 2 may be an integrally formed member that is formed, for example, by an injection molding process. The first engaging portion 21 may be configured to be detachably engaged with the child carrier 5. The child carrier 5 may be, for example, but not limited to, a car seat or a carry-cot. For convenience of mounting the child carrier 5, the engaging member 2 may be, for example, non-rotatably connected to the first bracket 13. For example, the first bracket 13 may be a flat tube, and a first end 201 of the engaging member 2 may sleeve the first bracket 13 via a flat hole 20 and may be fixed by the hinge pin 27. Alternatively, the first bracket 13 may also be designed to be a circular tube according to requirements. At least one of the first engaging portion 21 and the second engaging portion 22 may be, for example, arranged near a second end 202 of the engaging member 2. The second bracket 14 may be provided with a locking portion 4. When the first bracket 13 and the second bracket 14 are in a folded state, the locking portion 4 and the second engaging portion 22 may be detachably engaged with each other, thus locking the first bracket 13 and the second bracket 14 in the folded state.

According to the embodiments of the present disclosure, by arranging the first engaging portion 21 and the second engaging portion 22 on the engaging member 2, the engaging member 2 can be detachably engaged with the child carrier 5 via the first engaging portion 21 when the frame is unfolded, and can be detachably engaged with the locking portion 4 via the second engaging portion 22 when the frame is folded, such that the engaging member 2 may be used as a folding hook. As such, the child stroller requires no additional folding hook, thus simplifying the structure of the frame, reducing cost of the frame, and improving appearance design of the frame advantageously.

Reference is made to FIGS. 2 and 5. In some embodiments, the first engaging portion 21, for example, includes a first recess arranged at a first side 2a of the engaging member 2. The child carrier 5 may be provided with an elastically retractable engaging block 51, and the engaging block 51 is configured to be engaged with the first recess. For convenience of mounting the child carrier 5 on the frame, the engaging block 51 may have a mounting slope 511, and a depth d1 of an upper portion of the first recess is smaller than a depth d2 of a lower portion of the first recess, such that the engaging block 51 can easily slide into the first recess and is locked in the first recess. Optionally, the depth d1 of the upper portion of the first recess may be set to be equal to the depth d2 of the lower portion of the first recess. The child carrier 5 may be equipped with a disengagement mechanism configured to disengage the engaging block 51 from the first recess. Reference may be made to the prior art for the details of the disengagement mechanism, which will not be reiterated herein. It should be noted that implementations of the first engaging portion 21 are not limited to the above-mentioned first recess. In practical applications, the implementations of the first engaging portion 21 may have any suitable structure as long as the first engaging portion can be detachably engaged with the child carrier 5.

Figure 4:
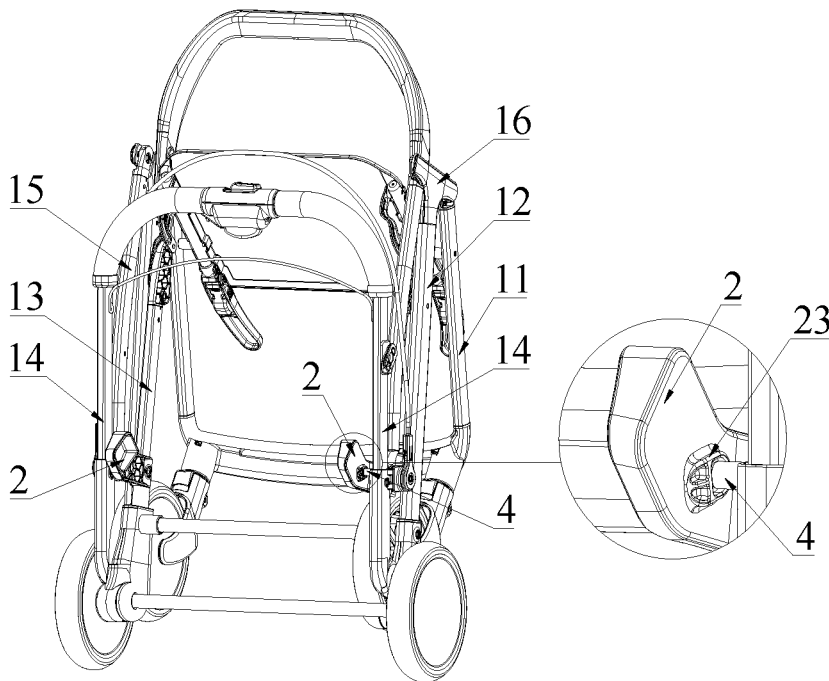
FIG. 4 is a perspective schematic view of a child stroller in a folded state according to an embodiment of the present disclosure.

Reference is made to FIGS. 4 and 6. The locking portion 4 may include a locking stud that is mounted on the second bracket 14. The second engaging portion 22 may include a second recess arranged at a second side 2b of the engaging member 2, and the first side 2a and the second side 2b face away from each other. In some embodiments, the second side 2b of the engaging member 2 may be provided with a protrusion portion 23 and a guide slope 24 connected to the protrusion portion 23, and the second recess may be formed in the protrusion portion 23. The locking portion 4 is configured to be engaged into the second recess via the guide slope 24. It may be understood that the locking portion 4 can be moved out of the second recess via the guide slope 24. It should be noted that implementations of the second engaging portion 22 are not limited to the above-mentioned second recess as long as the second engaging portion 22 can be matched with the locking portion 4 such that the engaging member 2 can function as a folding hook.

A folding process of the child stroller 100 including the engaging member 2 in the embodiment of the present disclosure will be briefly described below.

Reference is made to FIG. 2. When the child stroller 100 needs to be folded, the engaging block 51 of the child carrier 5 is separated from the first engaging portion 21 (first recess) of the engaging member 2 so that the child carrier 5 is disassembled, and then the frame is folded. When the frame is folded into the state shown in FIG. 3, the user may directly push the locking portion 4 into the second engaging portion 22 of the engaging member 2, such that the locking portion 4 and the second engaging portion 22 are restricted with each other. As such, the first bracket 13 and the second bracket 14 can be locked together, and the frame is stably folded into the state shown in FIG. 4.

When the frame needs to be unfolded, the user may pull the first bracket 13 and the second bracket 14 apart to disengage the locking portion 4 from the second engaging portion 22, thereby releasing the locking between the first bracket 13 and the second bracket 14, which allows the frame to be unfolded to the state shown in FIG. 2. After the engaging block 51 of the child carrier 5 is engaged into the first recess of the engaging member 2, the child stroller 100 shown in FIG. 1 can be used.

Various technical features of the embodiments mentioned above may be arbitrarily combined. To simplify description, not all possible combinations of various technical features of the embodiments mentioned above are described. However, as long as there is no contradiction in the combinations of these technical features, they shall be considered to fall within the scope of this specification.

The embodiments described above are merely several types of embodiments of the present disclosure, and are specifically described in details, but cannot be thus interpreted as limiting the scope of the patent for the disclosure. It shall be noted that for those of ordinary skill in the art, several modifications and improvements can be made without deviating from concepts of the present disclosure, all of which shall be considered to fall within the protection scope of the present disclosure. Hence, the protection scope of the patent for the present disclosure shall be subject to the appended claims.

What is claimed is:

1. A child stroller, comprising a frame including a first bracket and a second bracket that are foldable, wherein the first bracket is provided with an engaging member, the engaging member including a first engaging portion and a second engaging portion, the first engaging portion being configured to be detachably engaged with a child carrier;

the second bracket is provided with a locking portion, and when the first bracket and the second bracket are in a folded state, the locking portion and the second engaging portion are detachably engaged with each other to lock the first bracket and the second bracket in the folded state;

wherein the first bracket is a backrest frame, and the second bracket is a handle frame; and the frame further includes a front wheel support, a rear wheel support and a connection frame, wherein an upper end of the rear wheel support is provided with a pivotal portion, an upper end of the front wheel support is pivotally connected to a first connection portion of the pivotal portion, a lower end of the connection frame is pivotally connected to a second connection portion of the pivotal portion, an upper end of the connection frame is pivotally connected to a first pivotal connection portion of the second bracket, the first bracket is pivotally connected to the rear wheel support via a second pivotal connection portion, and an upper end of the first bracket is pivotally connected to a lower end of the second bracket.

2. The child stroller according to claim 1, wherein the locking portion comprises a locking stud.

3. The child stroller according to claim 1, wherein a first end of the engaging member sleeves the first bracket and is fixed by a hinge pin, and the first engaging portion and/or the second engaging portion are arranged near a second end of the engaging member.

4. The child stroller according to claim 1, wherein the child stroller comprises a seat portion mounted on the frame; and/or the child carrier is a car seat or a carry-cot.

5. The child stroller according to claim 1, wherein the first engaging portion includes a first recess, and the second engaging portion comprises a second recess.

6. The child stroller according to claim 5, wherein the first recess is arranged at a first side of the engaging member, and the second recess is arranged at a second side of the engaging member, the first side and the second side facing away from each other.

7. The child stroller according to claim 6, wherein the second side of the engaging member is provided with a protrusion portion and a guide slope connected to the protrusion portion, the second recess is formed in the protrusion portion, and the locking portion is configured to be engaged into the second recess via the guide slope.

8. The child stroller according to claim 5, wherein the child carrier is provided with an elastically retractable engaging block configured to be engaged with the first recess.

9. The child stroller according to claim 8, wherein the engaging block is provided with a mounting slope, and a depth of an upper portion of the first recess is smaller than a depth of a lower portion of the first recess.

10. A child stroller, comprising a frame including a first bracket and a second bracket that are foldable, wherein the first bracket is provided with an engaging member, the engaging member including a first engaging portion and a second engaging portion, the first engaging portion being configured to be detachably engaged with a child carrier; and the second bracket is provided with a locking portion, and when the first bracket and the second bracket are in a folded state, the locking portion and the second engaging portion are detachably engaged with each other to lock the first bracket and the second bracket in the folded state, wherein the first engaging portion includes a first recess, and the second engaging portion comprises a second recess, the child carrier is provided with an elastically retractable engaging block configured to be engaged with the first recess, and the engaging block is provided with a mounting slope, and a depth of an upper portion of the first recess is smaller than a depth of a lower portion of the first recess.

11. The child stroller according to claim 10, wherein the locking portion comprises a locking stud.

12. The child stroller according to claim 10, wherein a first end of the engaging member sleeves the first bracket and is fixed by a hinge pin, and the first engaging portion and/or the second engaging portion are arranged near a second end of the engaging member.

13. The child stroller according to claim 10, wherein the child stroller comprises a seat portion mounted on the frame; and/or the child carrier is a car seat or a carry-cot.

14. The child stroller according to claim 10, wherein the first recess is arranged at a first side of the engaging member, and the second recess is arranged at a second side of the engaging member, the first side and the second side facing away from each other.

15. The child stroller according to claim 14, wherein the second side of the engaging member is provided with a protrusion portion and a guide slope connected to the protrusion portion, the second recess is formed in the protrusion portion, and the locking portion is configured to be engaged into the second recess via the guide slope.

* * * * *